United States Patent
Zhou

(10) Patent No.: US 12,196,388 B2
(45) Date of Patent: Jan. 14, 2025

(54) LIGHT-EMITTING DEVICE, VEHICLE LAMP AND VEHICLE

(71) Applicant: VALEO VISION, Bobigny (FR)

(72) Inventor: Zhufeng Zhou, Wuhan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/547,526

(22) PCT Filed: Feb. 21, 2022

(86) PCT No.: PCT/EP2022/054286
§ 371 (c)(1),
(2) Date: Aug. 23, 2023

(87) PCT Pub. No.: WO2022/179988
PCT Pub. Date: Sep. 1, 2022

(65) Prior Publication Data
US 2024/0125452 A1  Apr. 18, 2024

(30) Foreign Application Priority Data
Feb. 24, 2021 (CN) .......................... 202120410783.6

(51) Int. Cl.
*F21S 43/20* (2018.01)
*B60Q 1/30* (2006.01)
(Continued)

(52) U.S. Cl.
CPC ............... *F21S 43/26* (2018.01); *B60Q 1/30* (2013.01); *F21S 43/31* (2018.01); *F21Y 2115/10* (2016.08)

(58) Field of Classification Search
CPC . F21S 43/26; F21S 43/31; F21S 43/14; F21Y 2115/10; B60Q 1/30; F21V 5/004; F21V 5/008; F21V 5/048
See application file for complete search history.

(56) References Cited

U.S. PATENT DOCUMENTS

| 6,612,728 B2 * | 9/2003 | Roller ..................... F21S 43/26 |
| | | 362/521 |
| 7,772,988 B1 * | 8/2010 | Condon ................ G09F 21/048 |
| | | 340/815.57 |

(Continued)

FOREIGN PATENT DOCUMENTS

| DE | 10 2007 063 569 A1 | 7/2009 |
| EP | 2 378 187 A1 | 10/2011 |

(Continued)

OTHER PUBLICATIONS

German 102007063569, Steffen Wiersdorff, Jul. 2, 2009, English Translation (Year: 2009).*

(Continued)

*Primary Examiner* — Peggy A Neils
(74) *Attorney, Agent, or Firm* — Oblon, McClelland, Maier & Neustadt, L.L.P.

(57) ABSTRACT

The present invention relates to a light-emitting device, a vehicle lamp and a vehicle, wherein a light-emitting device is used for a vehicle, the vehicle having a vehicle coordinate system that comprises three coordinate axes (X, Y, Z), the light-emitting device having a housing, a light-emitting assembly accommodated in the housing and a lens arranged in front of the light-emitting assembly, the lens having a light-transmitting zone assigned to the light-emitting assembly, wherein the light-transmitting zone is formed by a first strip unit and a second strip unit that extend obliquely with respect to the corresponding coordinate axis (Z) of the vehicle coordinate system, the first strip unit and the second strip unit intersecting each other, the intersection part being a convex or concave pillow-shaped unit.

14 Claims, 3 Drawing Sheets

(51) Int. Cl.
*F21S 43/31* (2018.01)
*F21Y 115/10* (2016.01)

(56) References Cited

U.S. PATENT DOCUMENTS 10,451,246 B2 * 10/2019 Piehler ............... G02B 19/0014
2002/0003708 A1    1/2002 Roller et al.
2008/0225547 A1    9/2008 Rogers et al.

FOREIGN PATENT DOCUMENTS

GB       2 274 508 A     7/1994
JP       2009-164126 A   7/2009
JP       2014-157733 A   8/2014

OTHER PUBLICATIONS

International Search Report issued May 16, 2022 in PCT/EP2022/054286, filed on Feb. 21, 2022, 4 pages.
Office Action issued Jul. 26, 2024, in corresponding Japanese Patent Application No. 2023-551264, 4 pages.

* cited by examiner a            b

LIGHT-EMITTING DEVICE, VEHICLE LAMP AND VEHICLE

TECHNICAL FIELD

The present invention relates to a light-emitting device, a vehicle lamp and a vehicle.

BACKGROUND ART

In the prior art, various types of light-emitting devices are known, for example, in vehicles. Such a light-emitting device has a housing, a light source accommodated in the housing, and a light-transmitting lens that seals the opening of the housing. The light-transmitting lens should be shaped to match the overall appearance of the vehicle while achieving light distribution meeting the requirement of the regulations.

SUMMARY OF THE INVENTION

Therefore, an objective of the present invention is to provide a light-emitting device that improves optical efficiency and employs a simplified design in addition to meeting the above-described requirements.

According to the present invention, this objective is achieved by proposing a light-emitting device for a vehicle, the vehicle having a vehicle coordinate system that comprises three coordinate axes, the light-emitting device having a housing, a light-emitting assembly accommodated in the housing, and a lens arranged in front of the light-emitting assembly, the lens having a light-transmitting zone assigned to the light-emitting assembly, wherein the light-transmitting zone is formed by a first strip unit and a second strip unit that extend obliquely with respect to the corresponding coordinate axis of the vehicle coordinate system, wherein the first strip unit and the second strip unit intersect with each other, the intersection part being a convex or concave pillow-shaped unit.

Therefore, when the proposed light-emitting device is mounted in a vehicle, the four sides forming each pillow-shaped unit may be inclined with respect to, for example, the Z-axis that points upward through the centre of mass of the vehicle coordinate system of the vehicle. The optical efficiency of such a four-sided inclined pillow-shaped unit is higher than that of a known pillow-shaped unit having, for example, a pair of sides parallel to the Z-axis.

According to an embodiment of the present invention, the first strip unit and the second strip unit are inclined symmetrically with respect to a coordinate axis. Herein, an angle formed by the central axes of the first strip unit and the second strip unit may be an acute angle, a right angle or an obtuse angle, so as to improve the optical effect.

According to an embodiment of the present invention, the first strip unit and the second strip unit have the same geometric dimensions. Therefore, the four sides of a formed pillow-shaped unit have the same length, and the pillow-shaped unit is a diamond-shaped unit.

According to an embodiment of the present invention, the lens further has a light-reflecting zone. The light-reflecting zone functions, in particular, to reflect light projected onto it from the outside, thereby sending an optical signal to another traffic participant. Therefore, the same lens can fulfil a light transmission function and a light reflection function at the same time. Preferably, the area of the light-reflecting zone should be set to be equal to or larger than the minimum area prescribed. In one embodiment, the light-reflecting zone may surround the light-transmitting zone, which means that the light-transmitting zone is in the middle of the lens.

According to an embodiment of the present invention, the light-reflecting zone is in the form of an array of corner reflector units, and the corresponding sub-reflection surfaces of the corner reflector units intersect perpendicularly in pairs. In such a light-reflecting zone, incident light may be reflected back in a direction opposite to the incident direction, so as to ensure traffic safety when the vehicle is driven.

According to an embodiment of the present invention, the light-emitting device has a main light output direction, and in a projection of the lens on a plane perpendicular to the main light output direction, a long boundary of the first strip unit or the second strip unit is parallel to or coincident with one of the intersecting lines between the sub-reflection surfaces of the corner reflector units. This is beneficial to designing a strip unit to match a corner reflector unit, thereby shortening the time required to design strip units that form the light-reflecting zone and achieving advantageous manufacture.

According to an embodiment of the present invention, the first strip unit or the second strip unit has a width W of 2-3 mm and a height T of 0.3-0.6 mm.

According to another aspect of the present invention, a vehicle lamp that has a light-emitting device as described above is proposed.

According to another aspect of the present invention, a vehicle that has a light-emitting device or vehicle lamp as described above is proposed.

BRIEF DESCRIPTION OF THE DRAWINGS

The present invention is further explained below with the aid of the drawings. In the drawings.

SPECIFIC EMBODIMENTS

Embodiments of the present invention will be described demonstratively below. As those skilled in the art should realise, the embodiments explained may be amended in various ways without departing from the concept of the present invention. Thus, the accompanying drawings and the description are in essence demonstrative and non-limiting. In the following text, identical drawing reference labels generally indicate functionally identical or similar elements.

Figure 1:
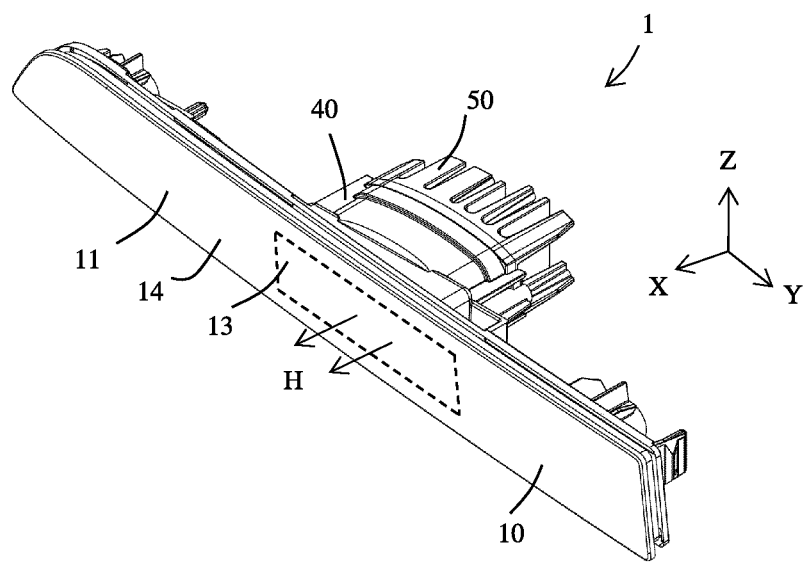
FIG. 1 is a schematic perspective view of an embodiment of a light-emitting device according to the present invention.

An embodiment of a light-emitting device 1 for a vehicle is shown in FIG. 1. The vehicle has a vehicle coordinate system that comprises three coordinate axes X, Y, and Z, wherein, when the vehicle is stationary on a level road, the X-axis points to the front of the vehicle parallel to the ground, the Z-axis points upward through the centre of mass of the vehicle, and the Y-axis points to the driver's left. For convenience of explanation, the light-emitting device 1 will be described below with reference to a vehicle coordinate system.

Figure 2:
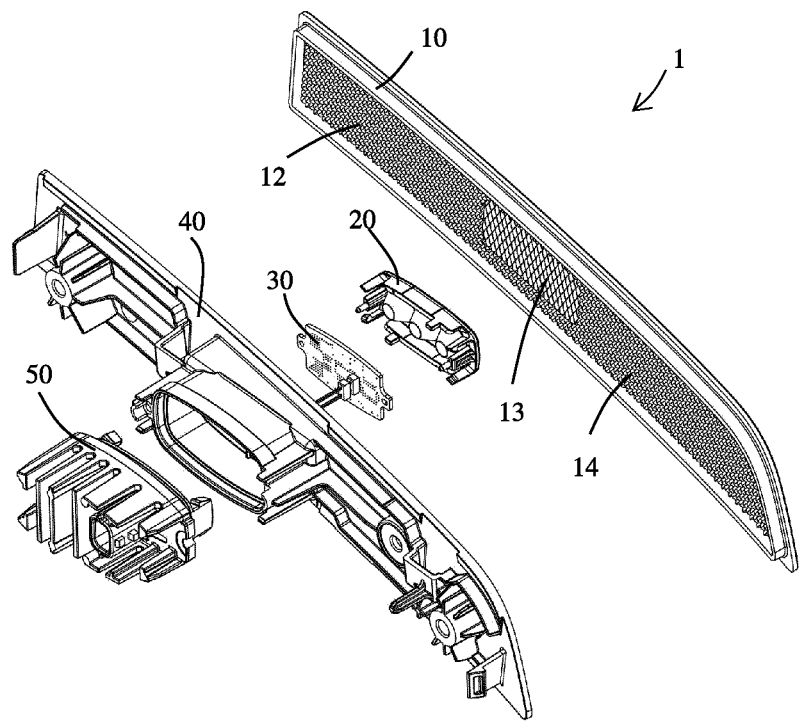
FIG. 2 is an exploded view of the light-emitting device of FIG. 1.

In the illustrated example, referring to FIGS. 1 and 2, the light-emitting device 1 has a housing 40, a light-emitting assembly 30 accommodated in the housing 40, and a lens 10 arranged in front of the light-emitting assembly 30. The lens 10 may be used to seal the opening of the housing 40. The light-transmitting zone 13 of the lens 10 assigned to the light-emitting assembly 30 is indicated by a dashed box in FIG. 1. It is clear that the light-transmitting zone 13 occupies only a part of the lens 10. Alternatively, the light-transmitting zone 13 may occupy the entire surface of the lens 10. The lens 10 may be directly used to seal the opening of the housing 40. Indeed, the opening of the housing 40 may also be sealed by an additional outer lens arranged in front of the lens 10. For a lens 10 that directly seals the opening of the housing 40, a relevant structurally designed surface is preferably arranged on the side of the lens 10 facing the light source, that is, facing the inner space of the housing. If the housing 40 is provided with an additional outer lens, the above-described structurally designed surface of the lens 10 may be arranged on either side of the lens 10.

The light-emitting assembly 30 may be in the form of a printed circuit board assembly, and a light source in the form of a semiconductor light source (such as a light-emitting diode), for example, may be mounted on a printed circuit board of the printed circuit board assembly. A unit 20 for modulating light from a light source, for example, a collimated light modulation unit, may further be arranged between the light-emitting assembly 30 and the lens 10, so that a conical light beam is at least approximately converted into a parallel light beam, thereby simplifying subsequent light modulation.

In the housing 40, a channel may be reserved for establishing an indirect connection between the light-emitting assembly 30 and a power source (for example, a vehicle-mounted power source).

When the power of an electric component of the light-emitting assembly 30 is high, the light-emitting assembly 30 may be provided with a heat dissipation unit 50, which may be made of materials with high thermal conductivity, for example, metals (such as aluminium and copper) and composite materials (such as silicon carbide). Preferably, a light source of the light-emitting assembly 30 may be directly arranged on the heat dissipation unit 50. The heat dissipation unit 50 may be directly arranged in the above-mentioned channel of the housing 40 and, for this purpose, a sealing member not shown is arranged on the periphery where the heat dissipation unit 50 comes into contact with the channel.

Figure 3:
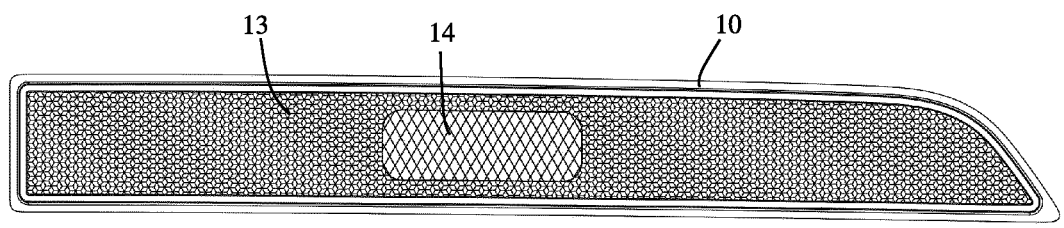
FIG. 3 is a rear view of a lens of the light-emitting device of FIG. 2.

A rear view of the lens 10 is shown in FIG. 3. The lens 10 is used to seal the opening of the housing 40. Here, the structurally designed surface of the lens 10 faces the light source assembly 30. Here, the lateral surface 12 of the lens 10 facing the inside of the light source assembly 30 is divided into a light-reflecting zone 13 and a light-transmitting zone 14, which have different structurally designed microstructures respectively, as will be explained further below. Although it is shown that the light-transmitting zone 14 is surrounded by the light-reflecting zone 13 on the lateral surface 12, the light-reflecting zone 13 and the light-transmitting zone 14 may further be arranged in another manner, as long as the light-reflecting zone 13 meets the requirement for the minimum area. For example, in an example not shown, the light-reflecting zone 13 occupies the left side of the lateral surface 12, while the light-transmitting zone 14 occupies the right side thereof. It is also possible to provide a plurality of light-transmitting regions 14 arranged separately from one another.

Figure 4:
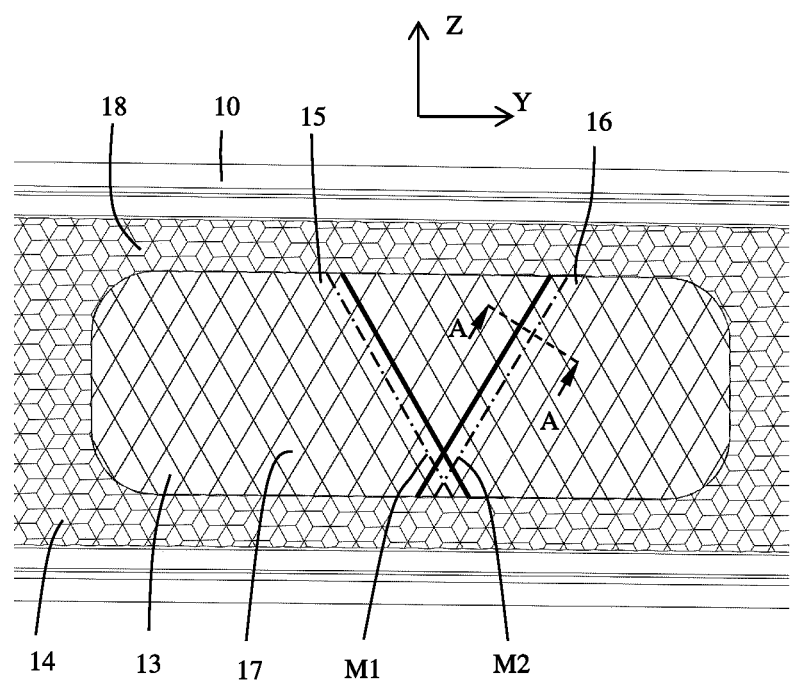
FIG. 4 is a partial enlarged view of the lens of FIG. 3.
Figure 6:
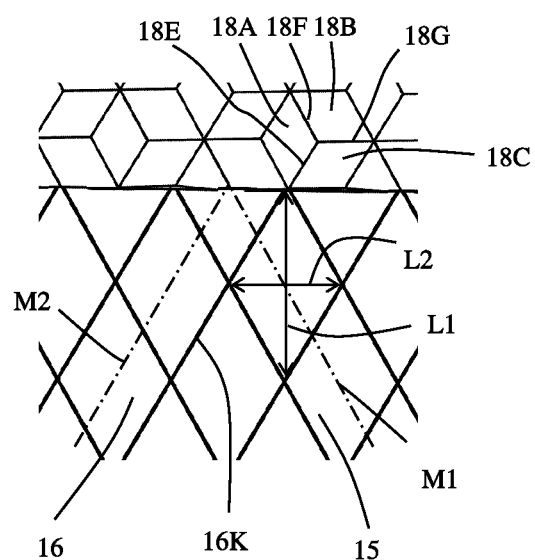
FIG. 6 is a partial enlarged view of the adjacent regions of the light-transmitting zone and the light-reflecting zone of the lens of FIG. 4.

As may be seen in the enlarged illustrations of FIG. 4 and FIG. 6, the light-reflecting zone 14 is in the form of an array of corner reflector units 18, while the light-transmitting zone 13 is an array of pillow-shaped units 17.

Each corner reflector unit 18 has three sub-reflection surfaces 18A, 18B, and 18C, which are perpendicular to one another, thereby forming three intersecting lines 18D, 18E, and 18F. The sub-reflection surfaces 18A, 18B, 18C are each preferably rectangular, in particular, square. The sub-reflection surfaces of the plurality of corner reflector units 18 are adjacent to each other and distributed in an array to form the light-reflecting surfaces of the light-reflecting zone 14. Light cast on such a light-reflecting zone 14 may be reflected back in a direction opposite to the incident direction, thereby ensuring reliable visibility.

In the example shown, the longitudinal extension of the elongated lens 10 corresponds to the Y-axis of the vehicle coordinate system in the mounting position. Therefore, the light-transmitting zone 13 may be regarded as being formed by the first strip unit 15 and the second strip unit 16 that extend obliquely with respect to the corresponding coordinate axis Z of the vehicle coordinate system, wherein the first strip unit 15 and the second strip unit 16 intersect each other. As may be clearly seen in FIG. 4, an included angle formed by the central axes M1 and M2 of the obliquely intersecting first strip unit 15 and second strip unit 16 may be an acute angle, a right angle, or an obtuse angle.

For example, the profile of a cross-section of the strip unit in a plane transverse to the central axis thereof may be in the form of a circular arc curve segment or a compound curve.

Preferably, the first strip unit 15 and the second strip unit 16 are inclined symmetrically with respect to the coordinate axis Z.

Further preferably, the first strip unit 15 and the second strip unit 16 have the same geometric dimensions. The four sides of the pillow-shaped unit 17 thus formed have the same length. Especially when the central axes M1 and M2 are vertical, the boundary formed by the four sides of the pillow-shaped unit 17 may be regarded as a square rotated by 45° around the centre of a horizontally placed square. This allows improved light gathering.

In a projection of the lens 10 on a plane perpendicular to the main light output direction H of the light-emitting device 1, the elongated boundary 16K of the first strip unit 15 or the second strip unit 16 (also indicated by a bold solid line in FIG. 4) is parallel to or coincident with one of the intersecting lines between the sub-reflection surfaces 18A, 18B, and 18C of the corner reflector unit 18. Especially in the case of coincidence, an end point of the elongated boundary or an extension line of the elongated boundary may be at the intersection of the three sub-reflection surfaces of the corner reflector unit. While ensuring the desired optical effect, this allows a strip unit to employ a simplified design.

Figure 5:
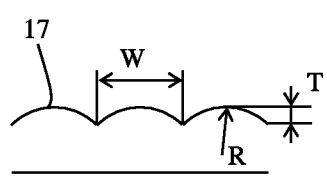
FIG. 5 shows two cross-sectional views taken along line A-A of FIG. 4.
Figure 5:
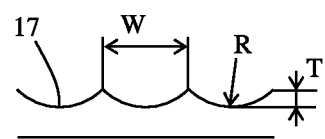

Two exemplary forms of the profile of a strip unit on a plane perpendicular to the central axis thereof are shown in FIG. 5. As may be seen, the surface of the formed pillow-shaped unit 17 may be a convex profile (see drawing a on the left) and a concave profile (see drawing b on the right). The two profile forms shown may have the same dimensions, except for the difference in being convex and concave, respectively. For example, each pillow-shaped unit 17 has a width W of 2-3 mm and a height T of 0.3-0.6 mm. A height may be the distance between the highest point and the lowest point of the curved profile of the pillow-shaped unit 17 in a cross-section thereof. The profile shown is a circular arc segment with a radius R. In an example not shown, a profile may also be a compound curved profile, a higher-order curved profile, or another suitable profile.

It should be noted that although it is mentioned in the above embodiments that the lens 10 has a light-reflecting zone 14, the light-reflecting zone is not required. In other words, the lens 10 may be entirely arranged with the above-described strip units 15 and 16 on at least one side.

In one embodiment, a strip unit as described above may be formed by guiding, along a given wire (for example, a straight wire or an arc-shaped wire), a profile that forms a generatrix, and a pillow-shaped unit is formed by intersecting strip units. When the wire is straight and the generatrix is an arc segment, a formed strip unit may be regarded as a cylindrical lens unit.

In another embodiment, intersecting strip units form a closed profile on a projection plane. When the strip units extend linearly on the projection plane, a closed profile formed is a quadrilateral profile. Especially when strip units inclined in different directions have the same width, the quadrilateral profile is a diamond-shaped profile. For a diamond-shaped profile, a pillow-shaped unit may be formed by a first arc connecting a pair of opposing vertices of the diamond-shaped profile to form a generatrix, and a second arc connecting another pair of opposing vertices of the diamond-shaped profile and the four sides of the diamond-shaped profile to form a wire, the centre of the first arc falling on the second arc, wherein, when the first arc is guided on the second arc, the two ends of the first arc are respectively guided along the sides of the four sides of the diamond-shaped profile on both sides of the second arc. The first arc and second arc may be circular arcs or in other shapes.

A pillow-shaped unit may also be formed in another manner.

The above-described light-emitting device 1 is preferably used for lighting and/or signal lamps for vehicles, such as daytime driving lamps, fog lamps, brake lamps, direction indicator lamps, clearance lamps, and reversing lamps.

The lens 10 is preferably a one-piece injection-moulded part, for example, made of polycarbonate, polymethyl methacrylate or the like. If necessary, the lens 10 may be coloured, for example, with yellow, red or another colour.

The present invention, instead of being limited to the above-described structures, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A light-emitting device for a vehicle, the light-emitting device having a housing, a light-emitting assembly accommodated in the housing and a lens arranged in front of the light-emitting assembly, the lens having a light-transmitting zone assigned to the light-emitting assembly, wherein the light-transmitting zone is formed by a first strip unit of a light-transmitting element and a second strip unit of the light-transmitting element that extend obliquely with respect to a coordinate axis (Z) running perpendicular to a length of the lens, wherein the first strip unit and the second strip unit intersect with each other, the intersection part being a convex or concave pillow-shaped unit,
   the lens has a light-reflecting zone surrounding the light-transmitting zone,
   the light-reflecting zone is in the form of an array of corner reflector units having perpendicularly intersecting sub-reflection surfaces,
   the light-emitting device outputs light in a main light output direction, and a boundary along a length of the first strip unit or the second strip unit is parallel to or coincident with an intersecting line between the sub-reflection surfaces of the corner reflector units in a projection of the lens on a plane perpendicular to the main light output direction.

2. The light-emitting device according to claim 1, wherein the first strip unit and the second strip unit are symmetrically inclined with respect to the coordinate axis (Z).

3. The light-emitting device according to claim 1, wherein the first strip unit and the second strip unit have the same geometric dimensions.

4. The light-emitting device according to claim 1, wherein the first strip unit or the second strip unit has a width W of 2-3 mm and a height (T) of 0.3-0.6 mm.

5. A vehicle lamp, wherein the vehicle lamp has a light-emitting device according to claim 1.

6. A vehicle, wherein the vehicle has a light-emitting device according to claim 1.

7. The light-emitting device according to claim 2, wherein the lens further has a light-reflecting zone.

8. The light-emitting device according to claim 2, wherein the first strip unit or the second strip unit has a width W of 2-3 mm and a height (T) of 0.3-0.6 mm.

9. A vehicle lamp, wherein the vehicle lamp has a light-emitting device according to claim 2.

10. A vehicle, wherein the vehicle has a light-emitting device according to claim 2.

11. The light-emitting device according to claim 3, wherein the lens further has a light-reflecting zone.

12. The light-emitting device according to claim 3, wherein the first strip unit or the second strip unit has a width W of 2-3 mm and a height (T) of 0.3-0.6 mm.

13. A vehicle lamp, wherein the vehicle lamp has a light-emitting device according to claim 3.

14. A vehicle, wherein the vehicle has a light-emitting device according to claim 3.

* * * * *